No. 641,841. Patented Jan. 23, 1900.
J. COLLINS.
ENDLESS BELT.
(Application filed Mar. 18, 1897.)
(No Model.)
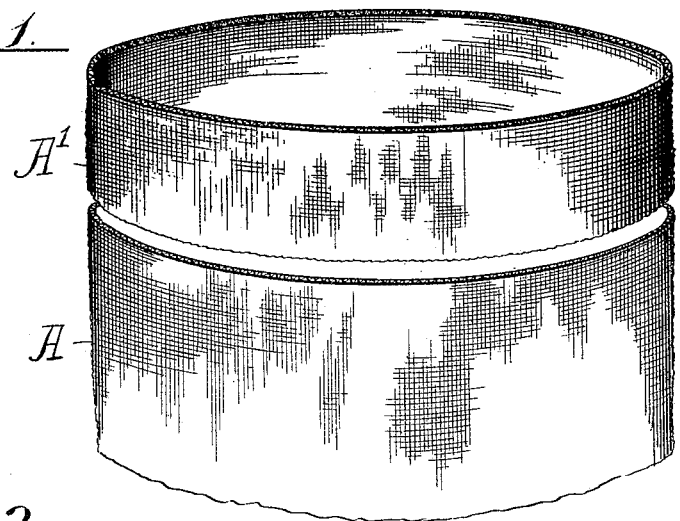
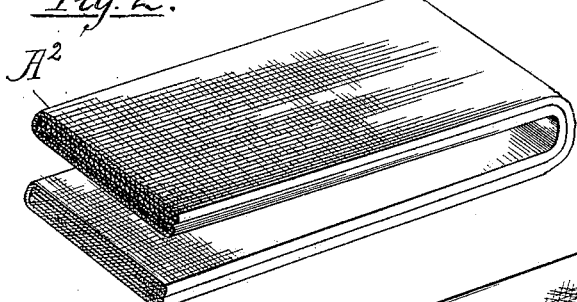
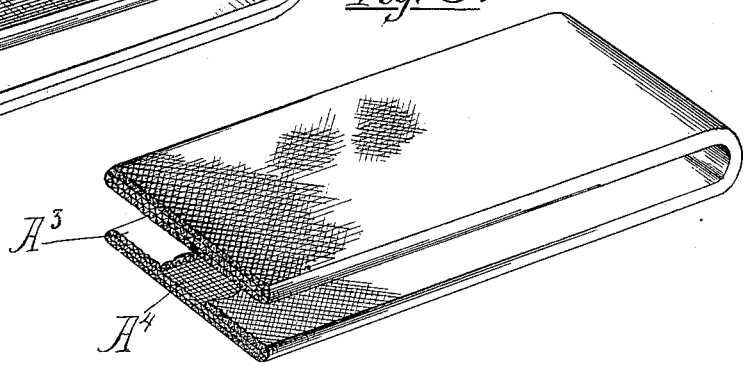
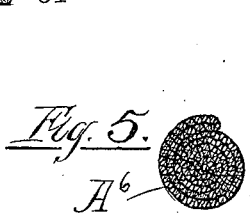
Witnesses
L. Clinton Hamlink
Willis D. Shafer
Inventor
Jerrott Collins.
by: Carter & Frazer
his Attorneys

UNITED STATES PATENT OFFICE.

JENNET COLLINS, OF CHICAGO, ILLINOIS.

ENDLESS BELT.

SPECIFICATION forming part of Letters Patent No. 641,841, dated January 23, 1900.

Application filed March 18, 1897. Serial No. 628,179. (No model.)

*To all whom it may concern:*

Be it known that I, JENNET COLLINS, of Chicago, in the county of Cook and State of Illinois, have invented certain new and useful Improvements in Endless Belts, of which the following is a specification.

This invention relates to improvements in belts, and refers more specifically to an improved endless fabric belt for use in power transmission or otherwise.

A principal object of the invention is to provide a fabric belt which is devoid of cross-seams, laps, lacings, or the like and which is more uniform in construction, pliability, and wearing qualities than endless belts as heretofore manufactured. At the same time my invention greatly facilitates and cheapens the cost of manufacture, and I am, furthermore, enabled to make belts of any desired width or number of plies or thicknesses within reasonable limits.

The invention consists in the matters hereinafter described, and more particularly pointed out in the appended claims, and the same will be readily understood by reference to the accompanying drawings, in which—

Figure 1 is a perspective view of a section of tubular woven fabric in which the belt-strips are cut, one of the latter being shown severed and in proximity to the main body. Fig. 2 is a perspective view of a belt showing a transverse section of the same and showing the manner in which the interior of this particular belt is folded. Fig. 3 is a similar perspective of a belt containing three plies only. Fig. 4 is a transverse sectional view of one lap only of a still simpler form. Fig. 5 is a similar section of a circular or rope form of belt formed from the same kind of a strip.

Heretofore fabric belts have been made by cutting a suitable fabric into long strips in suitable lengths and widths and thereafter joining the meeting ends to make the belt continuous in various ways—such, for instance, as overlapping and cementing, sewing, lacing, and otherwise; but belts thus made have been very unsatisfactory owing to the impossibility of securing at the same time a smooth uniform union and the required durability. More recently endless fabric belts have been made by first forming an annular band of warp-thread or skeleton of the belt of the desired width and thereafter weaving in the weft-web or filling transversely of the warp, commencing at any given point and weaving around longitudinally of the belt until the starting-point has been reached. In carrying out this method a loom is usually employed to weave the greater part of the filling of the belt; but it has been impossible to completely finish the belt by means of a shuttle-loom because of the impossibility of passing the shuttle through the warp when the latter has been nearly covered throughout its entire length. Usually a space of from three inches upward is left between the point where the weaving was commenced and the point where it becomes impossible to longer pass the shuttle through the warp, and this portion must be woven in by hand—that is, by means of a shuttle passed through thread by thread. This is a serious objection, among other reasons, first, because it requires a relatively long time to perform so tedious a job, and, secondly, because the weaving must be of necessity done by an expert weaver in order that it may conform as nearly in character as possible to the machine-work of the loom, and, finally, because the weaving by hand cannot, in fact, be made entirely uniform with the machine-work, and that part of the weaving woven by hand will be more or less irregular and the belt correspondingly imperfect. Furthermore, this last method is open to serious objection not only because it requires a relatively long time to perform the weaving, owing to the necessarily limited throw of the shuttles, but for various other reasons, which will hereinafter more fully appear.

My present invention consists in making belts from a continuous tubular fabric which may be woven practically as cheaply as any ordinary form of fabric and by the use of which the width of the belt or number of plies of which it is composed are practically unlimited.

Referring to said drawings, wherein I have shown various practical embodiments of the invention, A, Fig. 1, designates a tubular body of woven fabric made of the full diameter of the proposed length of the belt—that is to say, when the tubular body is caused to assume the form in cross-section of the endless belt it will be of equal measurements with the latter in all interior directions. The length of said body measured axially thereof may be unlimited, but in any event will be sufficient so that endless transverse annular band strips may be cut therefrom of sufficient width to form the proposed belt.

The form of weaving used in the making of the tubular body is not strictly essential, as will hereinafter more fully appear; but usually the warp threads or strands will extend parallel with the axis of the tubular body, but may be made to extend more or less spirally, if desired. On the contrary, the filling-threads will extend circumferentially in a direction at right angles to the axis of the body, so that when the strips are cut from the said body the weave thereof will be "on the straight" as distinguished from "on the bias."

The foregoing-described weaving is preferable, especially where it is intended to make the belt of a single strip, inasmuch as it obviously renders a belt less elastic longitudinally. If, on the other hand, it is desired to form a belt having one or more strips inclosed within an outer strip, so as to form a belt having a plurality of thicknesses or plies, it may be desirable to use filling-strips cut on the straight to insure the proper degree of normal elasticity and an outer covering strip or band formed on a bias in order to reduce the raveling of the belt to a minimum after its working edges have worn through.

From the foregoing it will be understood that my invention is not limited to any particular weave of fabric, provided it embodies the characteristics necessary to produce the belt described, so long as the weft-threads or those which run circumferentially of the tubular body or longitudinally of the belt are substantially inelastic.

Having thus provided a suitable tubular body, I sever the same transversely, so as to form a strip $A'$ of the proper width to afford the desired width of the belt when said strip has been folded, as now to be described.

In making the form of belt shown in Fig. 2 said strip $A^2$ will be cut of a width approximately equal to four times the width of the finished belt. This strip will first be turned inwardly along its marginal edges at each side thereof a distance or width equal approximately to the width of the finished belt, and these two parts thus made two-ply will be folded face to face along the medium line of the strip, so as to produce the form shown in Fig. 2 in cross-section. The several plies of the belt thus formed may be either cemented or sewed together in any desired manner, the various methods of securing the plies together to form a practical homogeneous body being well understood in this art. Preferably, however, I use a rubber cement, which is applied to the strip before the latter is folded, the strip subsequently folded into the desired form, and the rubber thereafter vulcanized. When made in this manner, the vulcanized rubber serves to effectually secure the edges of the strip from raveling, even though the belt be made of but a single ply. I may, however, if found more desirable, employ rivets or analogous devices in lieu of the cement.

In Fig. 3 I have shown a form of belt which is made in the same general manner, with this difference, however, that in this case the belt is formed of two continuous strips $A^3$ $A^4$ cut from different tubular bodies, the inner one, $A^4$, being cut from a body woven on the straight, and the outer one cut from a tubular fabric woven on the bias. In this instance the edges of the outer strip are arranged to meet along the medium of the interior of the belt, at which point they are less liable to become loose or frayed out.

Fig. 4 is an obvious modification, in which a two-ply belt $A^5$ is made in precisely the same manner as that described in Fig. 3, with the exception that in this case the lining-strip is omitted and the belt is therefore of but two-ply thickness.

In Fig. 5 I have shown a construction in which a rope form of belt is made from one of the continuous strips $A^6$. In this instance the two raw edges of the strip are brought together, and starting with said longitudinal raw edges as an initial or axial point the double fabric is rolled together longitudinally to form a continuous belt of circular or rope form. This construction will obviously be best formed by the use of cement as the holding means, but other means may be employed, if desired, or found practicable.

In each of the foregoing constructions it is to be noted that the belt is devoid of cross seams or unions of any kind whatever, and it is also to be noted that the raw or cut edges of the fabric are in each instance so arranged as to be least exposed to wear.

It is to be understood that the foregoing described modifications constitute merely illustrative and preferred forms of carrying out the invention.

I claim as my invention—

1. As a new article of manufacture, a woven power-transmission belt comprising a transverse section of seamless tubular fabric having substantially inelastic weft-threads running circumferentially of the section, said section being folded or rolled to form a belt having a plurality of plies and the severed ends of the warp secured to prevent raveling.

2. As a new article of manufacture, a woven power-transmission belt comprising a transverse section of seamless tubular fabric having substantially inelastic weft-threads running circumferentially of the section, said section being folded or rolled to form a belt having a plurality of plies and the plies cemented together.

In testimony that I claim the foregoing as my invention I affix my signature, in presence of three subscribing witnesses, this 16th day of March, A. D. 1897.

JENNET COLLINS.

Witnesses:
ELLA L. MURTHA,
CARL ALEX. VOGEL,
T. D. HURLEY.